US011494095B1

(12) United States Patent
Yeung et al.

(10) Patent No.: US 11,494,095 B1
(45) Date of Patent: Nov. 8, 2022

(54) POWER BEHAVIOR DETECTION IN A MEMORY DEVICE

(71) Applicant: Micron Technology, Inc., Boise, ID (US)

(72) Inventors: Chun Sum Yeung, San Jose, CA (US); Deping He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/368,579

(22) Filed: Jul. 6, 2021

(51) Int. Cl.
*G06F 12/00* (2006.01)
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
CPC ..... G06F 3/0625; G06F 3/0655; G06F 3/0679
See application file for complete search history.

(56) References Cited

U.S. PATENT DOCUMENTS

2014/0231954 A1 8/2014 Lue
2016/0179386 A1 6/2016 Zhang

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

*Primary Examiner* — Gurtej Bansal
(74) *Attorney, Agent, or Firm* — Brooks, Cameron & Huebsch, PLLC

(57) ABSTRACT

A method includes receiving, by a processing device, signaling indicative of a power cycle (PC) to a memory device (MD) having a first signal indicative of a Power On Operation and a second signal indicative of a Power Off Operation, and determining an Average Power On Time (APOT) of the MD based, at least in part, on a quantity of power cycles (n) to the MD over a predetermined time interval (PTI), and for each PC over the PTI, an amount of time between receipt of the first signal and the second signal. A sum of each of the amount of time between receipt of the first signal and the second signal in the PTI provides a total power on time (T) to the MD, and the APOT is equal to T/n. When the APOT is less than (<) a threshold APOT value, determining a frequency at which to perform media scan operations and performing media scan operations involving the MD at the determined frequency.

20 Claims, 4 Drawing Sheets

US 11,494,095 B1

POWER BEHAVIOR DETECTION IN A MEMORY DEVICE

TECHNICAL FIELD

Embodiments of the disclosure relate generally to memory sub-systems, and more specifically, relate to power behavior detection in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
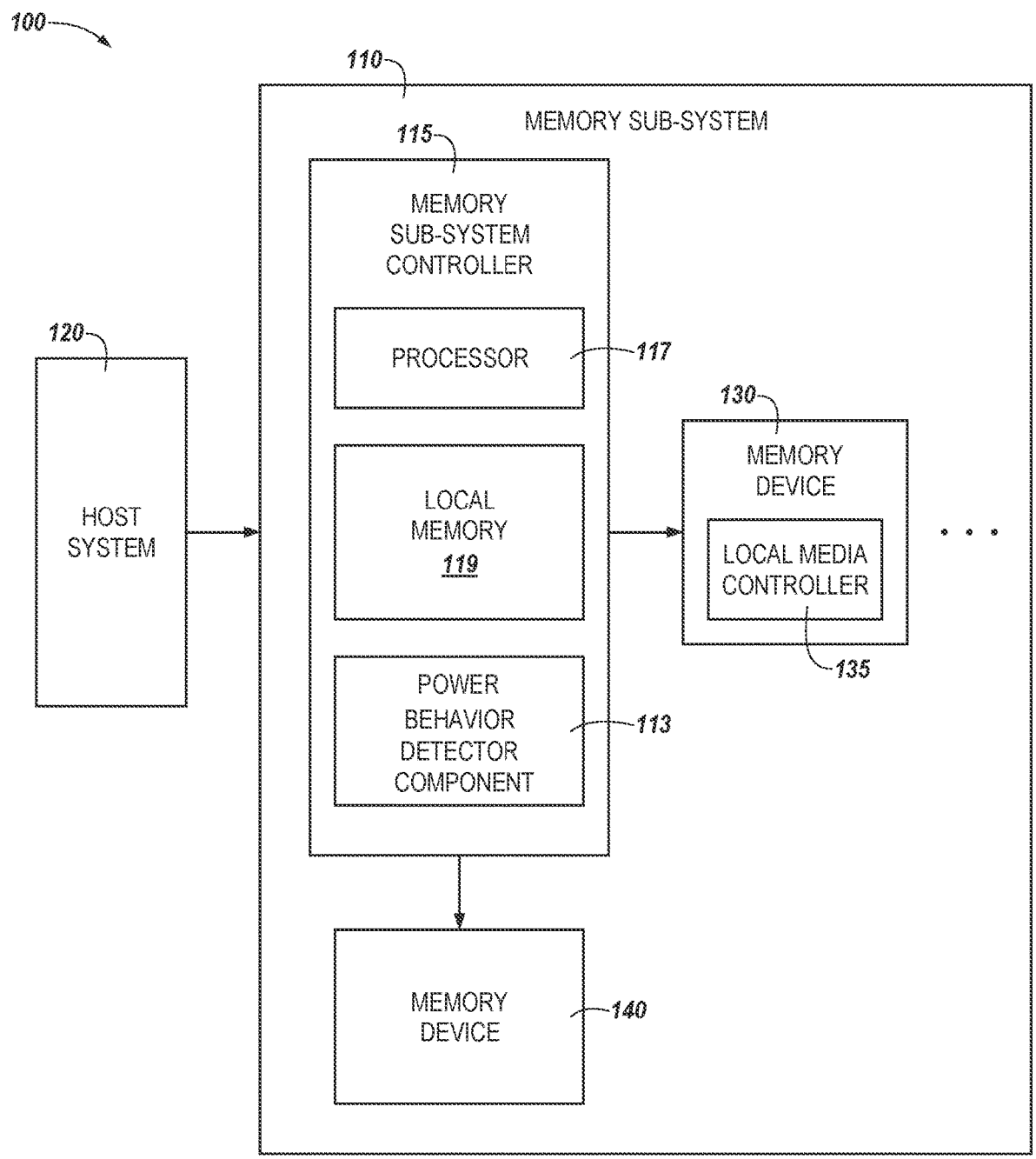
FIG. 1 illustrates an example computing system that includes a memory sub-system in accordance with some embodiments of the present disclosure.

Aspects of the present disclosure are directed to power behavior detection in a memory device, in particular to power behavior detection that includes a power behavior detector component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

The above described memory devices can be found in many of today's battery powered mobile devices. As the battery life of these mobile devices is finite, power saving techniques to prolong the battery life has become an important area of interest. For example, in an effort to prolong battery life certain mobile host chipsets remove power to non-volatile memory devices in such devices after only a few seconds of user inactivity. This can result in thousands of power on and power off operations (i.e., power cycles) to the non-volatile memory devices over the course of a day. Such power cycles typically occur through the output stage logic power voltage (VCCQ) pin or "input/output (I/O) power pin," which provides power to, e.g., the NAND memory device, whereas power from the device power supply (VCC) pin to other non-volatile memory devices is maintained. Maintaining power through the VCC pin allows the system clocks for these other non-volatile memory devices to be maintained. For example, with Universal Flash Storage (UFS) the UFS controller with its system clock is powered via the VCC pin even though the power at the VCCQ pin to the NAND memory device may undergo power cycles. Mobile host chipsets are now, however, undergoing power cycles involving both the VCCQ pin and the VCC pin in an effort to prolong battery life, which means that the system clock of, for example, the UFS controller is being reset each power cycle. As a result, keeping track of the correct time in the UFS, among other memory devices, is becoming more difficult.

Difficulties in keeping track of the correct time in the memory device (e.g., the UFS) can lead to issues with system maintenance algorithms. Until recently, maintenance algorithms in memory devices relied upon an uninterrupted supply of power being provided to the VCC pin when the mobile device was on. Maintenance algorithms check the data integrity in the memory device using scheduled media scans that can be spread out over a predetermined amount of time (e.g., over 30 days). This is still the case with many memory devices, however memory device that undergo thousands of power cycles per day to prolong their battery life are now, or soon will be, used in mobile devices. For these devices when the power is off the system clock is reset and there is no media scanning taking place. Both issues can throw off the maintenance schedule of the memory device. So, being able to distinguish if a memory device in a mobile device is undergoing a high number of power cycles (e.g., thousands per day) is an important consideration in ensuring proper system maintenance for the mobile device.

Aspects of the present disclosure address the above and other deficiencies by detecting if the memory device present in the mobile device is undergoing frequent power cycles (e.g., thousands of power cycles per day) or is undergoing relatively few power cycles per day (e.g., several power cycles per day). To this end, the present disclosure tracks a total power on time (T) along with a quantity of power cycles (n) to the memory device that occur over a predetermined time interval. As discussed more fully herein, the total power on time and the quantity of power cycles over the predetermined time interval are used to calculate an average power on time (APOT) for the memory device. The APOT is used in determining whether a criterion for the APOT is achieved. Responsive to determining that the criterion for the APOT is achieved, a frequency at which to perform media scan operations involving the memory device is determined and performed.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a Power Behavior Detector Component 113. Although not shown in FIG. 1 so as to not obfuscate the drawings, the Power Behavior Detector Component 113 can include various circuitry to facilitate receiving signaling indicative of a power cycle to the memory device and determining an Average Power On Time (APOT) of the memory device based on a quantity of power cycles (n) to the memory device and a total power on time (T) to the memory device, where the APOT (equal to T/n) is used in determining a frequency at which to perform media scan operations involving the memory device. In some embodiments, the Power Behavior Detector Component 113 can include special purpose circuitry in the form of an ASIC, FPGA, state machine, and/or other logic circuitry that can allow the Power Behavior Detector Component 113 to orchestrate and/or perform operations to detect what type of memory device for the memory device 130 and/or the memory device 140 is present in the mobile device: the type having frequent power cycles (e.g., thousands of power cycles per day) or the type having relatively few power cycles per day (e.g., several power cycles per day).

As used herein, a "power cycle" is defined as turning the power supplied through at least the VCC to the memory device 130 and/or the memory device 140 off (a Power Off Operation) and then subsequently back on (a Power On Operation) again.

In some embodiments, the memory sub-system controller 115 includes at least a portion of the Power Behavior Detector Component 113. For example, the memory sub-system controller 115 can include a processor 117 (processing device) configured to execute instructions stored in local memory 119 for performing the operations described herein. In some embodiments, the Power Behavior Detector Component 113 is part of the host system 110, an application, or an operating system.

In a non-limiting example, an apparatus (e.g., the computing system 100) can include a Power Behavior Detector Component 113. The Power Behavior Detector Component 113 can be resident on the memory sub-system 110. As used herein, the term "resident on" refers to something that is physically located on a particular component. For example, the memory sub-system Power Behavior Detector Component 113 being "resident on" the memory sub-system 110 refers to a condition in which the hardware circuitry that comprises the Power Behavior Detector Component 113 is physically located on the memory sub-system 110. The term "resident on" can be used interchangeably with other terms such as "deployed on" or "located on," herein.

The Power Behavior Detector Component 113 can be configured to detect signaling that includes a first signal indicative of a Power On Operation of the memory device 130 and/or the memory device 140 and a second signal, following the first signal, indicative of a Power Off Operation of the memory device 130 and/or the memory device 140. As described above, the memory device 130 and/or the memory device 140 can be memory dice or memory packages that form at least a portion of the memory device 130 and/or memory device 140.

The Power Behavior Detector Component 113 is further configured to determine an Average Power On Time (APOT) of the memory device 130 and/or the memory device 140 based, at least in part on a quantity of power cycles (n) to the memory device 130 and/or the memory device 140 over a predetermined time interval and for each power cycle over the predetermined time interval, an amount of time between receipt of the first signal and the second signal. The Power Behavior Detector Component 113 is configured to use the amount of time between receipt of the first signal and the second signal to determine a sum of each of the amount of time between receipt of the first signal and the second signal in the predetermined time interval, where the sum provides a total power on time (T) to the memory device during the predetermined time interval.

The Power Behavior Detector Component 113 is further configured to determine the APOT, which is equal to T/n. The Power Behavior Detector Component 113 also determines whether a criterion for the APOT is achieved. For example, one approach to determining whether the criterion for the APOT is achieved is to determine whether the APOT is less than (<) a threshold APOT value. As discussed herein, determining that the APOT is less than the threshold APOT value indicates the memory device 130 and/or the memory device 140 is undergoing frequent power cycles (e.g., thousands of power cycles per day).

Responsive to a determination that the criterion for the APOT is achieved (e.g., whether the APOT less than (<) the threshold APOT value), the Power Behavior Detector Component 113 determines a frequency at which to perform media scan operations involving the memory device. In determining the frequency at which to perform media scan operations involving the memory device, the Power Behavior Detector Component 113 is configured to determine a fractional amount of a set of memory cells of the memory device to undergo media scan operations over the total power on time (T) of the predetermined time interval to achieve a complete media scan of the set of memory cells over a media scan period. For the various embodiments, the predetermined time interval is less than a total time of the media scan period.

The Power Behavior Detector Component 113 is further configured to divide the fractional amount of the set of memory cells of the memory device to undergo media scan operations by at least a portion of the quantity of power cycles (n) experienced by the processing device (e.g., processor 117) over the predetermined time interval to give a frequency number of media scan operations per predetermined time interval. For the various embodiments, the frequency number of media scan operations is less than the quantity of power cycles (n) experienced by the processing device (e.g., processor 117) over the predetermined time interval.

Using the determined frequency, the Power Behavior Detector Component 113 performs or assists in performing media scan operations involving the memory device. For the various embodiments, the memory device, such as the memory device 130 and/or the memory device 140, to undergo media scan operations can include a set of memory cells that can be part of one or more of a block, a stripe, a die and/or a word line of the memory device. For the various embodiments, the Power Behavior Detector Component 113 can perform a complete media scan of the memory device over the media scan period. So, when the memory device comprises a plurality of sets of memory cells, each set of memory cells among the plurality of sets of memory cells undergo a complete media scan over the media scan period.

Figure 2:
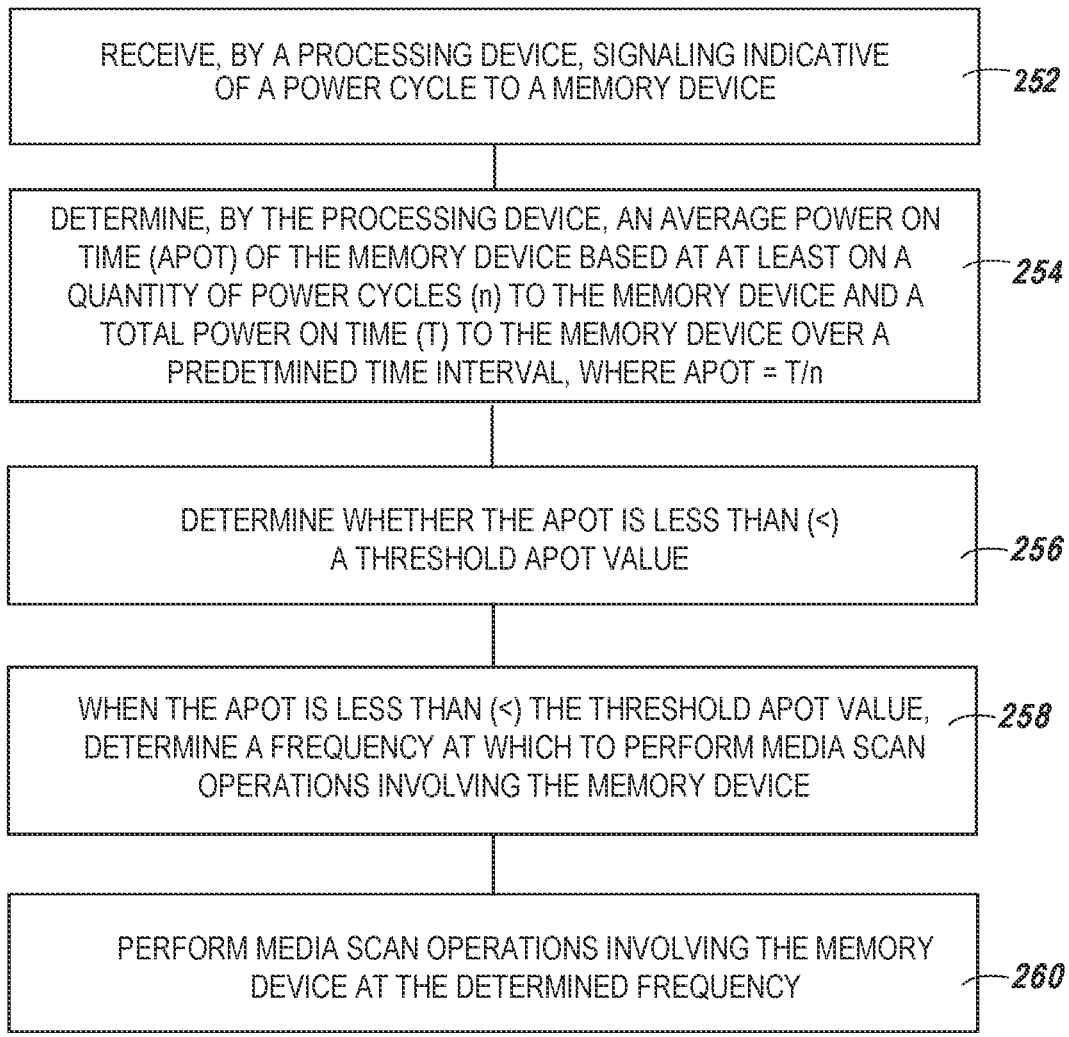
FIG. 2 is a flow diagram corresponding to a method for power behavior detection in a memory device in accordance with some embodiments of the present disclosure.

FIG. 2 is a flow diagram corresponding to a method 250 for power behavior detection in a memory device in accordance with some embodiments of the present disclosure. The method 250 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 250 is performed by the Power Behavior Detector Component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 252, signals indicative of a power cycle to a memory device can be received by a processing device, as provided herein. Each of the signals indicative of the power cycle comprise a first signal indicative of a Power On Operation of the memory device and a second signal, following the first signal, indicative of a Power Off Operation of the memory device (e.g., the memory device 130 and/or the memory device 140 illustrated in FIG. 1, herein). In some embodiments, the signals indicative of a power cycle to the memory device are monitored and received by a memory sub-system Power Behavior Detector, such as the Power Behavior Detector Component 113 illustrated in FIG. 1.

At operation 254, a determination can be made using the processing device as to an Average Power On Time (APOT) of the memory device. The APOT can be determined at least in part on a quantity of power cycles (n) to the memory device over a predetermined time interval and a total power on time (T). Values for the predetermined time interval can be determined based on a number of factors, which may include the size of memory that is to undergo media scan operations, the media scan period over which the media scan operations complete a full scan of the memory and/or predetermined values for the predetermined time interval derived from average and/or mean values used in a similar or an identical computing system. Preferably, the predetermined time interval has a value of around twenty-four (24) hours.

The total power on time (T) can be determined using each power cycle over the predetermined time interval. At operation 254, an amount of time between receipt of the first signal and the second signal is determined, where a sum of each of the amount of time between receipt of the first signal and the second signal in the predetermined time interval provides the total power on time (T) to the memory device. As noted herein, the APOT is equal to T/n.

At operation 256, a determination can be made as to whether the APOT achieves a criterion. For example, a determination can be made as to whether the APOT determined in operation 254 is less than (<) a threshold APOT value. Values for the threshold APOT value can be determined based on a number of factors, which may include the size of memory that is to undergo media scan operations, the media scan period over which the media scan operations complete a full scan of the memory and/or predetermined values for the predetermined time interval derived from average and/or mean values used in a similar or an identical computing system. In some embodiments, the threshold APOT value has a value of ten (10) hours/power cycle or less.

For the various embodiments, the media scan period is the time required to complete a full scan of the memory. The time required to complete a full scan of the memory can depend on a number of factors, which include the size of memory that is to undergo media scan operations, the media scan period over which the media scan operations complete a full scan of the memory and/or predetermined values for the time required to complete a full scan of the memory derived from average and/or mean values used in a similar or an identical computing system. For the various embodiments, the media scan period has a value of several days (e.g., 3 days) to several months (e.g., 90 days). Preferably, the media scan period has a value of around thirty (30) days.

At operation 258, responsive to the determination that the criterion for the APOT is achieved (e.g., when the APOT is less than (<) the threshold APOT value), a determination of a frequency at which to perform media scan operations involving the memory device is made. The determination of a frequency at which to perform media scan operations can include several things. These include the determination of a fractional amount of a set of memory cells of the memory device to undergo media scan operations over the total power on time (T) of the predetermined time interval to achieve a complete media scan of the set of memory cells over a media scan period. The fractional amount of the set of memory cells of the memory device to undergo media scan operations is used in a division operation with at least a portion of the quantity of power cycles (n) experienced by the processing device over the predetermined time interval to give a frequency number of media scan operations per predetermined time interval. For the various embodiments, the frequency number of media scan operations can be (e.g., is) less than the quantity of power cycles (n) experienced by the processing device over the predetermined time interval. For the various embodiments, the predetermined time interval can be less than a total time of the media scan period.

Figure 3:
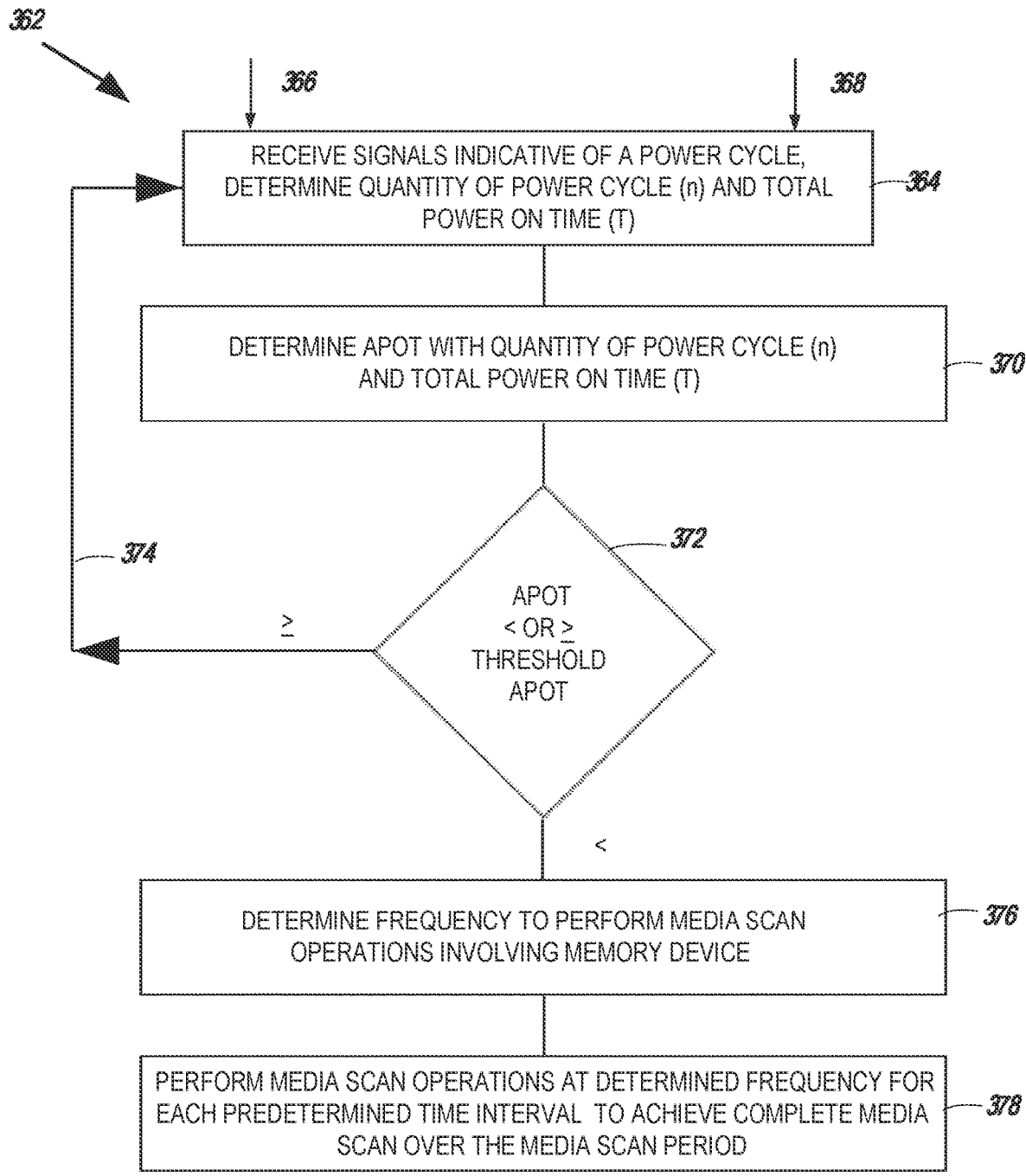
FIG. 3 is a flow diagram corresponding to power behavior detection in a memory device in accordance with some embodiments of the present disclosure.

At operation 260, media scan operations involving the memory device can be performed at the determined frequency. For the various embodiments, the media scan operations at the determined frequency are intended to accomplish a complete media scan of the memory device over the media scan period. So, where the memory device comprises a plurality of sets of memory cells, each set of memory cells among the plurality of sets of memory cells undergo the complete media scan over the media scan period. FIG. 3 provides a flow diagram along with an illustration of these operations, as follows.

FIG. 3 is a flow diagram 362 corresponding to a memory sub-system Power Behavior Detector in accordance with some embodiments of the present disclosure. At operation 364, signals indicative of a power cycle to the memory device are received. Each of the power cycles comprise the first signal 366 indicative of the Power On Operation of the memory device and the second signal 368, following the first signal 366, indicative of the Power Off Operation of the memory device. The quantity of power cycles (n) to the memory device are determined along with the total power on time (T) with the first signal 366 and the second signal 368 over the predetermined time interval at operation 364 as discussed herein. In some embodiments, the signals indicative of the power cycle to the memory device are monitored and received by a memory sub-system Power Behavior Detector, such as the Power Behavior Detector Component 113 illustrated in FIG. 1, as previously discussed.

At operation 370, the processing device determines the APOT of the memory device based the quantity of power cycles (n) to the memory device over the predetermined time interval and the total power on time (T), where the APOT is equal to T/n.

At operation 372, a determination whether a criterion for the APOT is achieved is made. As previously discussed, one example of such a determination is whether the APOT is less than or greater than or equal to a threshold APOT value. Continuing with this example, when the APOT value is greater than or equal to (≥) the threshold APOT value (i.e., "NO" the criterion for the APOT is not achieved) the memory sub-system Power Behavior Detector returns to operation 364, via 374, and the processing device continues to receive signals indicative of power cycles to the memory device in a predetermined time interval subsequent to the predetermined time interval used in the determination of the APOT at operation 370.

When the APOT value is less than (<) the threshold APOT value (i.e., "YES" the criterion for the APOT is achieved) the memory sub-system Power Behavior Detector proceeds to operation 376. At operation 376, the frequency at which to perform media scan operations involving the memory device is determined. For the various embodiments, to determine the frequency at which to perform media scan operations involving the memory device a fractional amount of a set of memory cells of the memory device to undergo media scan operations over the total power on time (T) of the predetermined time interval is determined, where the use of this frequency helps to achieve a complete media scan of the set of memory cells over the media scan period.

By way of example for the operations discussed to this point, assume a computing system, such as seen in FIG. 1, having a 90 gigabyte (GB) capacity memory device for which has been assigned a predetermined time interval of 24 hours, a threshold APOT value of 0.1 hours/cycle and a media scan period of thirty (30) days to achieve a complete scan of the 90 GB set of memory cells. For this given computing system, operation 364 determines a total power on time (T) for the memory device of, for the present example, four (4) hours and a quantity of power cycles (n), for the present example, of one hundred (100). These values give an APOT value of 0.04 hours/power cycle at operation 370. Operation 372 determines that the APOT achieves the criterion (e.g., the APOT) value is less than the threshold APOT value) and so proceeds to operation 376 to determine the frequency at which to perform media scan operations.

At operation 376, a fractional amount of the 90 GB set of memory cells to undergo media scan operations over the total power on time (T) of the predetermined time interval is determined. For the parameters of the computing system of the previous paragraph, the fractional amount of the 90 GB set of memory cells can be approximately a 3 GB subset of memory cells that can be provided as the set of memory cells of the memory device to undergo media scan operations over the total power on time (T) of the predetermined time interval. That is, in this illustrative example, around 90 GB of memory cells can be scanned over 30 days, which provides that around a 3 GB subset of the memory device should be scanned per day. The frequency at which to perform media scan operations involving the memory device is also determined at operation 376, where each of the fractional amounts of the around 3 GB subsets of memory cells of the memory device is scheduled to be completed within the total power on time (T) of four (4) hours for each day of the media scan period (e.g., 30 days).

For the various embodiments, operation 376 uses both the fractional amount of the set of memory cells of the memory device to undergo media scan operations and at least a portion of the quantity of power cycles (n) experienced by the processing device over the predetermined time interval to give a frequency number of media scan operations per predetermined time interval. For example, the fractional amount of the set of memory cells of the memory device to undergo media scan operations can be divided by at least a portion of the quantity of power cycles (n) experienced by the processing device over the predetermined time interval to give the frequency number of media scan operations per predetermined time interval. For the given example, the fractional amount of the set of memory cells of the memory device to undergo media scan operations over the total power on time (T) of four hours in the given predetermined time interval of 24 hours is around 3 GB. Over the total power on time (T) of four hours there are n power cycles (e.g., 100 power cycles) that divide the time that the media scans can take place. In the given example, four hours are divided by 100 power cycles to give a frequency number of media scan operations of 25 media scan operations per hour of the total power on time (T).

In an alternative embodiment, a rate for the media scan (e.g., GB/minute) for the given computing system can be used to determine the frequency at which to perform the media scan operations. For example, given a rate of 0.02 GB/minute for the media scan along with a total power on time (T) of four hours in which to complete a scan of 3 GB for the given predetermined time interval of 24 hours, the frequency at which to perform media scan operations would be approximately 0.625 scan/minute during the total power on time (T). Other techniques are possible to determine the frequency at which to perform the media scan operations.

For the various embodiments, the given frequency number of media scan operations for the total power on time (T) for the predetermined time interval can be distributed evenly over the total power on time (T) for a given predetermined time interval. In an alternative embodiment, the frequency number of media scan operations can be less than the quantity of power cycles (n) experienced by the processing device over the predetermined time interval. This embodiment then allows for an uneven distribution of the given frequency number of media scan operations for the total power on time (T) for the predetermined time interval (e.g., front load the media scan events).

At operation 378, media scan operations can take place at the frequency determined in operation 376 for each predetermined time interval in order to achieve a complete media scan of the set of memory cells over the media scan period.

Figure 4:
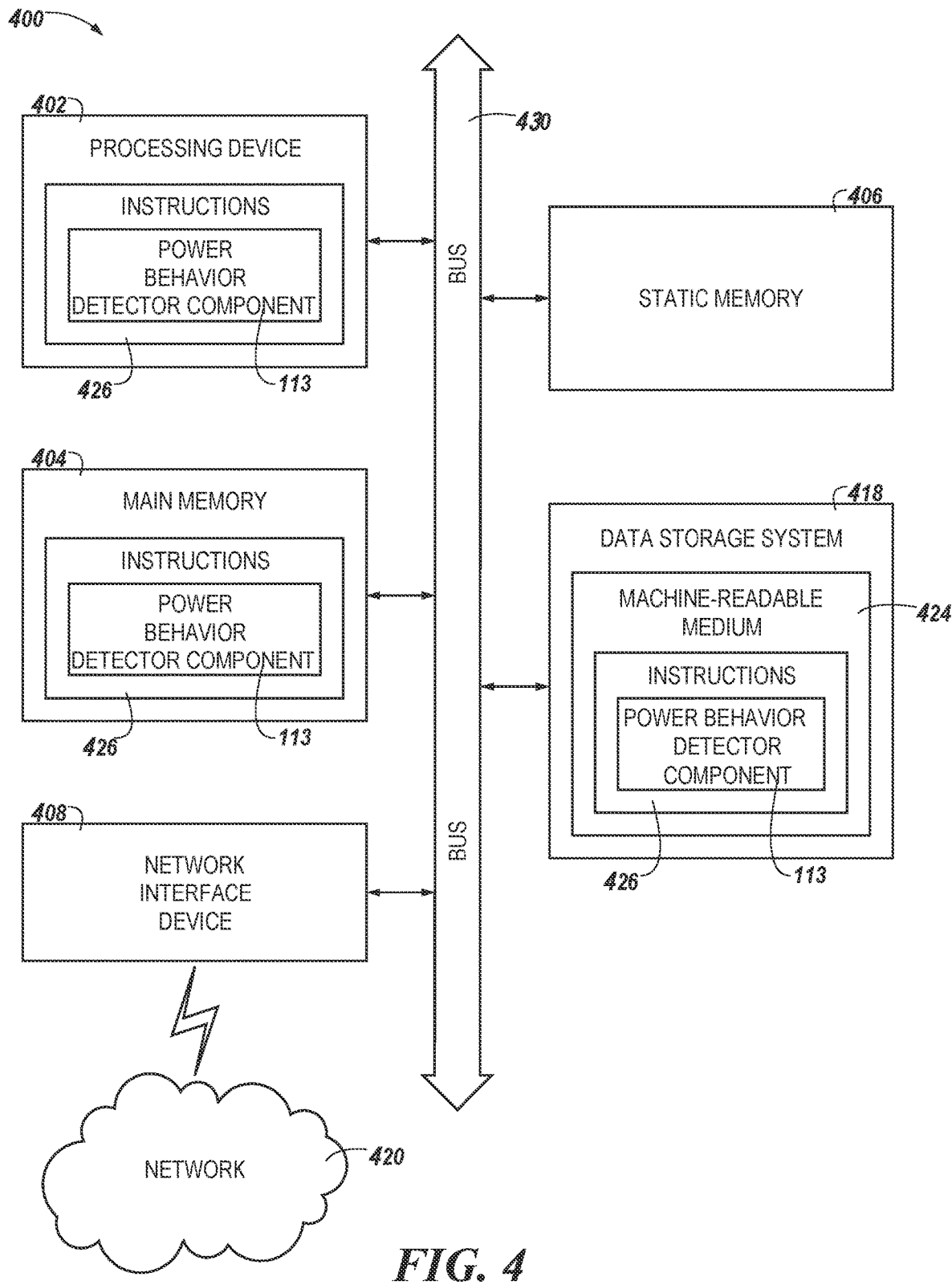
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the Power Behavior Detector Component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a Power Behavior Detector Component (e.g., the Power Behavior Detector Component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In a non-limiting example, the instructions 426 can be instructions that, when executed by a processing device 402 can cause the processing device to receive signaling indicative of a power cycle to the memory device, wherein the signaling includes a first signal indicative of a Power On Operation of the memory device and a second signal, following the first signal, indicative of a Power Off Operation of a memory device (e.g., the memory device 130 and/or the memory device 140 illustrated in FIG. 1, herein). The processing device 402 can further execute instructions to determine an Average Power On Time (APOT) of the memory device based, at least in part on a quantity of power cycles (n) of the memory device over a predetermined time interval and/or an amount of time between receipt of the first signal and the second signal for each power cycle over the predetermined time interval. The processing device 402 can further execute instructions to determine whether a criterion for the APOT is achieved and, responsive to a determination that the criterion for the APOT is achieved, determine a frequency at which to perform media scan operations involving the memory device. By way of example, the processing device 402 can execute instructions to determine whether the APOT is less than (<) a threshold APOT value and, responsive to a determination that the APOT is less than (<) the threshold APOT value, determine a frequency at which to perform media scan operations involving the memory device. The processing device 402 can further execute instructions to perform media scan operations involving the memory device at the determined frequency. In some embodiments, a sum of each of the amount of time between receipt of the first signal and the second signal in the predetermined time interval provides a total power on time (T) to the memory device, and the APOT is equal to T/n, as described above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
 receiving, by a processing device, signaling indicative of a power cycle to a memory device;
 determining an Average Power On Time (APOT) of the memory device based on the signaling indicative of power cycles to the memory device over a predetermined time interval;

determining whether a criterion for the APOT is achieved;
responsive to determining that the criterion for the APOT is achieved, determining a frequency at which to perform media scan operations involving the memory device; and
performing media scan operations involving the memory device at the determined frequency.

2. The method of claim 1, wherein determining the APOT of the memory device includes:
determining a quantity of power cycles (n) to the memory device over the predetermined time interval; and
for each power cycle of the quantity of power cycles (n) during the predetermined time interval, determining an amount of time between receipt of a first signal indicative of a Power On Operation of the memory device and a second signal, following the first signal, indicative of a Power Off Operation of the memory device, wherein:
a sum of the amount of time between receipt of the first signal and the second signal for each power cycle of the quantity of power cycles (n) during the predetermined time interval provides a total power on time (T) to the memory device, where the APOT is equal to T/n.

3. The method of claim 2, wherein determining the frequency at which to perform media scan operations includes:
determining a fractional amount of a set of memory cells of the memory device to undergo media scan operations over the total power on time (T) of the predetermined time interval to achieve a complete media scan of the set of memory cells over a media scan period; and
dividing the fractional amount of the set of memory cells of the memory device to undergo media scan operations by at least a portion of the quantity of power cycles (n) experienced by the processing device over the predetermined time interval to give a frequency number of media scan operations per predetermined time interval.

4. The method of claim 3, wherein the frequency number of media scan operations is less than the quantity of power cycles (n) experienced by the processing device over the predetermined time interval.

5. The method of claim 3, wherein the memory device comprises a plurality of sets of memory cells, and wherein each set of memory cells among the plurality of sets of memory cells undergo the complete media scan over the media scan period.

6. The method of claim 3, wherein the predetermined time interval is less than a total time of the media scan period.

7. The method of claim 1, wherein the predetermined time interval is around twenty-four (24) hours.

8. The method of claim 1, wherein the threshold APOT value has a value of ten (10) hours/power cycle or less.

9. An apparatus, comprising:
a memory device; and
a Power Behavior Detector coupled to the memory device, wherein the Power Behavior Detector is to:
receive signals indicative of a power cycle to the memory device;
determine a total power on time (T) to the memory device from a quantity of power cycles (n) over a predetermined time interval;
determine an Average Power On Time (APOT) of the memory device, where APOT is equal to T/n;
determine whether a criterion for the APOT is achieved;
responsive to a determination that the criterion for the APOT is achieved, determine a frequency at which to perform media scan operations involving the memory device; and
perform media scan operations involving the memory device at the determined frequency.

10. The apparatus of claim 9, wherein each signal indicative of the power cycle to the memory device include an amount of time between receipt of a first signal indicative of a Power On Operation of the memory device and a second signal, following the first signal, indicative of a Power Off Operation of the memory device, wherein a sum of the amount of time between receipt of the first signal and the second signal for each power cycle of the quantity of power cycles (n) in the predetermined time interval provides the total power on time (T) to the memory device.

11. The apparatus of claim 9, wherein in the determination of the frequency the Power Behavior Detector determines a fractional amount of a set of memory cells of the memory device to undergo media scan operations over the total power on time (T) of the predetermined time interval to achieve a complete media scan of the set of memory cells over a media scan period; and
divides the fractional amount of the set of memory cells of the memory device to undergo media scan operations by at least a portion of the quantity of power cycles (n) experienced by the processing device over the predetermined time interval to give a frequency number of media scan operations per predetermined time interval.

12. The apparatus of claim 11, wherein the frequency number of media scan operations is less than the quantity of power cycles (n) experienced by the processing device over the predetermined time interval.

13. The apparatus of claim 11, wherein the memory device comprises a plurality of sets of memory cells, and wherein each set of memory cells among the plurality of sets of memory cells undergo a complete media scan over the media scan period.

14. The apparatus of claim 11, wherein the predetermined time interval is less than a total time of the media scan period.

15. The apparatus of claim 9, wherein the memory device is a Universal Flash Storage device.

16. A non-transitory computer-readable storage medium comprising instructions that, when executed by a processing device, cause the processing device to:
receive signaling indicative of a power cycle to a memory device, wherein the signaling includes a first signal indicative of a Power On Operation of the memory device and a second signal, following the first signal, indicative of a Power Off Operation of the memory device;
determine an Average Power On Time (APOT) of the memory device based, at least in part on:
a quantity of power cycles (n) to the memory device over a predetermined time interval; and
for each power cycle over the predetermined time interval, an amount of time between receipt of the first signal and the second signal, wherein:
a sum of each of the amount of time between receipt of the first signal and the second signal in the predetermined time interval provides a total power on time (T) to the memory device, and
the APOT is equal to T/n;
determine whether a criterion for the APOT is achieved;

responsive to a determination that the criterion for the APOT is achieved, determine a frequency at which to perform media scan operations involving the memory device; and perform media scan operations involving the memory device at the determined frequency.

17. The non-transitory computer-readable storage medium of claim 16, further comprising instructions that, when executed by the processing device, cause the processing device to:

determine a fractional amount of a set of memory cells of the memory device to undergo media scan operations over the total power on time (T) of the predetermined time interval to achieve a complete media scan of the set of memory cells over a media scan period; and perform an operation to divide the fractional amount of the set of memory cells of the memory device to undergo media scan operations by at least a portion of the quantity of power cycles (n) experienced by the processing device over the predetermined time interval to give a frequency number of media scan operations per predetermined time interval.

18. The non-transitory computer-readable storage medium of claim 17, further comprising instructions that, when executed by the processing device, cause the processing device to control the frequency number of media scan operations such that the frequency of media scan operations is less than the quantity of power cycles (n) experienced by the processing device over the predetermined time interval.

19. The non-transitory computer-readable storage medium of claim 17, further comprising instructions that, when executed by the processing device, cause the processing device to cause each set of memory cells of the memory device to undergo a complete media scan over the media scan period.

20. The non-transitory computer-readable storage medium of claim 17, further comprising instructions that, when executed by the processing device, cause the processing device to set the predetermined time interval such that the predetermined time interval is less than a total time of the media scan period.

* * * * *